(12) United States Patent
McRell (10) Patent No.: US 7,124,594 B2
(45) Date of Patent: Oct. 24, 2006

(54) HIGH EFFICIENCY REFRIGERANT BASED ENERGY STORAGE AND COOLING SYSTEM

(75) Inventor: Michael W. McRell, Dublin, OH (US)

(73) Assignee: Ice Energy, Inc., Windsor, CO (US)

( * ) Notice: Subject to any disclaimer, the term of this patent is extended or adjusted under 35 U.S.C. 154(b) by 235 days.

(21) Appl. No.: 10/967,028

(22) Filed: Oct. 15, 2004

(65) Prior Publication Data

US 2005/0081557 A1    Apr. 21, 2005

Related U.S. Application Data

(60) Provisional application No. 60/511,953, filed on Oct. 15, 2003.

(51) Int. Cl.
*F25D 3/00* (2006.01)

(52) U.S. Cl. ............................ 62/59; 62/434; 65/104.17

(58) Field of Classification Search ............... 62/59, 62/117, 332, 430, 434, 436, 79, 99, 509, 118, 62/119, DIG. 2; 165/10, 104.17
See application file for complete search history.

(56) References Cited

U.S. PATENT DOCUMENTS

| | | | |
|---|---|---|---|
| 2,512,576 A | 6/1950 | Cross | |
| 3,746,084 A | 7/1973 | Ostbo | |
| 4,073,306 A | 2/1978 | Neyer | |
| 4,197,719 A * | 4/1980 | Shaw | 62/324.1 |
| 4,294,078 A | 10/1981 | MacCracken | |
| 4,403,645 A | 9/1983 | MacCracken | |
| 4,464,904 A * | 8/1984 | Steigman | 62/50.2 |
| 4,565,069 A | 1/1986 | MacCracken | |
| 4,608,836 A | 9/1986 | MacCracken et al. | |
| 4,609,036 A | 9/1986 | Schrader | |
| 4,619,317 A | 10/1986 | Disselbeck et al. | |
| 4,735,064 A | 4/1988 | Fischer | |
| 4,893,476 A | 1/1990 | Bos et al. | |
| 4,916,916 A | 4/1990 | Fischer | |
| 4,940,079 A * | 7/1990 | Best et al. | 165/236 |
| 4,964,279 A | 10/1990 | Osborne | |
| 5,005,368 A | 4/1991 | MacCracken et al. | |
| 5,109,920 A | 5/1992 | Merryfull | |
| 5,161,382 A * | 11/1992 | Missimer | 62/46.1 |
| 5,168,724 A * | 12/1992 | Gilbertson et al. | 62/430 |
| 5,211,029 A | 5/1993 | Uselton et al. | |

(Continued)

FOREIGN PATENT DOCUMENTS

DE        10057834 A1    9/1957

(Continued)

OTHER PUBLICATIONS

U.S. Appl. No. 10/967,114, filed Oct. 15, 2004, Ramachandran Narayanamurthy et al.

(Continued)

*Primary Examiner*—Mohammad M. Ali
(74) *Attorney, Agent, or Firm*—Cochran Freund & Young LLC; Paul M. Thompson (57) ABSTRACT

Disclosed is an efficient, energy storage and cooling system that is refrigerant based. When connected to a condensing unit, the system has the ability to store energy capacity during one time period and provide cooling from the stored energy during a second time period. The system requires minimal energy to operate during either time period, and only a fraction of the energy required to operate the system during the first time period is required to operate the system during the second time period using an optional refrigerant pump.

27 Claims, 3 Drawing Sheets

U.S. PATENT DOCUMENTS

| | | | |
|---|---|---|---|
| 5,255,526 A * | 10/1993 | Fischer | 62/59 |
| 5,307,642 A * | 5/1994 | Dean | 62/59 |
| 5,383,339 A | 1/1995 | McCloskey et al. | |
| 5,423,378 A | 6/1995 | Dillenbeck et al. | |
| 5,467,812 A | 11/1995 | Dean et al. | |
| 5,598,720 A | 2/1997 | MacCracken et al. | |
| 5,647,225 A | 7/1997 | Fischer et al. | |
| 5,666,823 A * | 9/1997 | Smith et al. | 62/646 |
| 5,678,626 A * | 10/1997 | Gilles | 165/62 |
| 5,682,752 A | 11/1997 | Dean | |
| 5,720,178 A | 2/1998 | Silvetti et al. | |
| 5,727,393 A * | 3/1998 | Mahmoudzadeh | 62/81 |
| 5,860,285 A * | 1/1999 | Tulpule | 62/127 |
| 6,158,499 A | 12/2000 | Rhodes et al. | |
| 6,247,522 B1 | 6/2001 | Kaplan et al. | |
| 6,250,098 B1 | 6/2001 | Huang | |
| 6,318,100 B1 * | 11/2001 | Brendel et al. | 62/217 |
| D501,490 S | 2/2005 | Kerrigan | |
| 2002/0162342 A1 | 11/2002 | Weng et al. | |

FOREIGN PATENT DOCUMENTS

| | | |
|---|---|---|
| DE | 19831127 A1 | 3/2001 |
| DE | 1015019 | 6/2002 |
| JP | 6-92136 A * | 4/1994 |
| JP | A-2000-266368 | 1/1996 |
| JP | 8-226682 | 9/1996 |
| JP | A-2001-296068 | 12/1998 |
| JP | 8014628 | 9/2000 |
| JP | 10339483 A | 9/2000 |
| JP | A-2000-249420 | 10/2001 |

OTHER PUBLICATIONS

U.S. Appl. No. 11/112,861, filed Apr. 22, 2005, Ramachandran Narayanamurthy et al.

U.S. Appl. No. 11/138,762, filed May 25, 2005, Ramachandran Narayanamurthy et al.

* cited by examiner

| TIME PERIOD AND MODE | AIR CONDITIONER UNIT | OIL STILL/ SURGE VESSEL | ICE FREEZING/ DISCHARGE COILS | PRESSURE OPERATED SLIDE VALVE |
|---|---|---|---|---|
| 1. REFRIGERANT ENERGY STORAGE | ON | OIL STILL | MAKING ICE, WITH REFRIGERANT FLOW BOTTOM TO TOP | CLOSED |
| 2. COOLING | OFF | SURGE VESSEL | CONDENSING, WITH REFRIGERANT FLOW TOP TO BOTTOM | OPEN |
| 2. PUSH | ON | COMBINATION OIL STILL AND SURGE VESSEL | CONDENSING, WITH REFRIGERANT FLOW TOP TO BOTTOM | OPEN |

FIGURE 3

HIGH EFFICIENCY REFRIGERANT BASED ENERGY STORAGE AND COOLING SYSTEM

CROSS REFERENCE TO RELATED APPLICATIONS

This application is based upon and claims the benefit of U.S. provisional application No. 60/511,953, entitled "High Efficiency Refrigerant Based Energy Storage and Cooling System", filed Oct. 15, 2003, the entire disclosure of which is hereby specifically incorporated by reference for all that it discloses and teaches.

BACKGROUND OF THE INVENTION

1. Field of the Invention

The present invention relates generally to systems providing stored energy in the form of ice, and more specifically to ice storage systems used to provide cooling, especially during peak electrical demand.

2. Description of the Background

With the increasing demands on peak power consumption, ice storage is an environmentally benign method that has been utilized to shift air conditioning power loads to off-peak times and rates. A need exists not only for load shifting from peak to off-peak periods, but also for increases in air conditioning unit capacity and efficiency. Current air conditioning units having energy storage systems have had limited success due to several deficiencies including reliance on water chillers, that are practical only in large commercial buildings, and have difficulty achieving high-efficiency. In order to commercialize advantages of thermal energy storage in large and small commercial buildings, thermal energy storage systems must have minimal manufacturing and engineering costs, maintain maximum efficiency under varying operating conditions, demonstrate simplicity in the refrigerant management design, and maintain flexibility in multiple refrigeration or air conditioning applications.

Systems for providing stored energy have been previously contemplated in U.S. Pat. No. 4,735,064, U.S. Pat. No. 4,916,916 both issued to Harry Fischer and to U.S. Pat. No. 5,647,225 issued to Fischer et al. All of these patents utilize ice storage to shift air conditioning loads from on-peak to off-peak electric rates to provide economic justification and are hereby specifically incorporated by reference for all they teach and disclose.

SUMMARY OF THE INVENTION

The present invention overcomes the disadvantages and limitations of the prior art by providing an efficient, energy storage and cooling system that is refrigerant based. When connected to a condensing unit, the system has the ability to store energy capacity during one time period and provide cooling from the stored energy during a second time period. The system requires minimal energy to operate during either time period, and only a fraction of the energy required to operate the system during the first time period is required to operate the system during the second time period using an optional refrigerant pump.

An embodiment of the present invention may therefore comprise a high efficiency energy storage and cooling system comprising: an air conditioning unit comprising a compressor and a condenser; an energy storage unit comprising an insulated tank that contains a storage heat exchanger and at least partially filled with a phase change liquid, the storage heat exchanger further comprising a lower collection header and an upper collection header connected by at least one thermally conductive member; a load heat exchanger; a refrigeration management unit connected to the air conditioning unit, the energy storage unit and the load heat exchanger; a universal refrigerant management vessel within the refrigeration management unit comprising: an outlet connection that returns refrigerant to the air conditioning unit; an inlet connection that receives refrigerant from the load heat exchanger, a mixed phase regulator, a combination oil still and refrigerant surge vessel, and the upper collection header of the storage heat exchanger; a first bottom port that provides bi-directional flow of refrigerant to a bottom collection header of the storage heat exchanger, the bottom outlet that supplies liquid refrigerant for connection to the load heat exchanger and the combination oil still and refrigerant surge vessel; a second bottom port that is connected to the combination oil still and refrigerant surge vessel through a P-trap; and, a pressure operated slide valve connected to the second bottom port and the air conditioning unit to supply refrigerant to the load heat exchanger.

An embodiment of the present invention may also comprise a method of providing cooling with an energy storage and cooling system comprising the steps of: condensing refrigerant with a condensing unit to create a first condensed refrigerant during a first time period; supplying the first condensed refrigerant to a combination oil still and refrigerant surge vessel, through a mixed phase regulator and to an inlet connection of a universal refrigerant management vessel; supplying at least a portion of the first condensed refrigerant from the universal refrigerant management vessel to an evaporating unit constrained within a tank that is at least partially filled with a phase change liquid; expanding the first condensed refrigerant within the evaporating unit to freeze a quantity of the phase change liquid and form ice within the tank during the first time period and produce a first expanded refrigerant; supplying the first expanded refrigerant from the evaporating unit to the inlet connection of the universal refrigerant management vessel; returning at least a portion of the first expanded refrigerant to the condensing unit; circulating a second expanded refrigerant from the universal refrigerant management vessel and through the evaporating unit within the block of ice during a second time period to condense the second expanded refrigerant and create a second condensed refrigerant; supplying the second condensed refrigerant to the universal refrigerant management vessel; circulating at least a portion of the second condensed refrigerant from the universal refrigerant management vessel to a load heat exchanger; expanding the second condensed refrigerant within the load heat exchanger to provide the cooling during the second time period, thereby producing additional second expanded refrigerant; and, returning the second expanded refrigerant to the universal refrigerant management vessel.

The disclosed embodiments offer the advantage of using power from electric utility companies during low demand, nighttime hours when these companies use their most efficient equipment. For example, high efficiency electric generators, typically stream-driven, produce a kilowatt-hour (KWH) for approximately 8,900 BTU. In contrast, a peak hour high capacity electrical generator, such as a gas turbine, can use as much as 14,000 BTU to produce the same KWH of electricity. Second, the transmission lines also run cooler at night resulting in higher efficiency of energy usage. Finally, for air-cooled air-conditioning systems, operating the system at night affords a higher efficiency by lowering the temperature of the condensing unit.

The disclosed refrigerant-based energy storage and cooling system has the advantage of operating at high efficiency providing an overall system that shifts power usage without significant total energy losses and with the increased efficiencies of off-peak power generation and off-peak compressor-based refrigerant cooling, a net reduction in the total energy consumption of an individual operating unit.

DETAILED DESCRIPTION OF THE INVENTION

While this invention is susceptible to embodiments in many different forms, there is shown in the drawings and will be described herein, in detail, specific embodiments thereof with the understanding that the present disclosure is to be considered as an exemplification of the principles of the invention and is not to be limited to the specific embodiments described.

Figure 1:
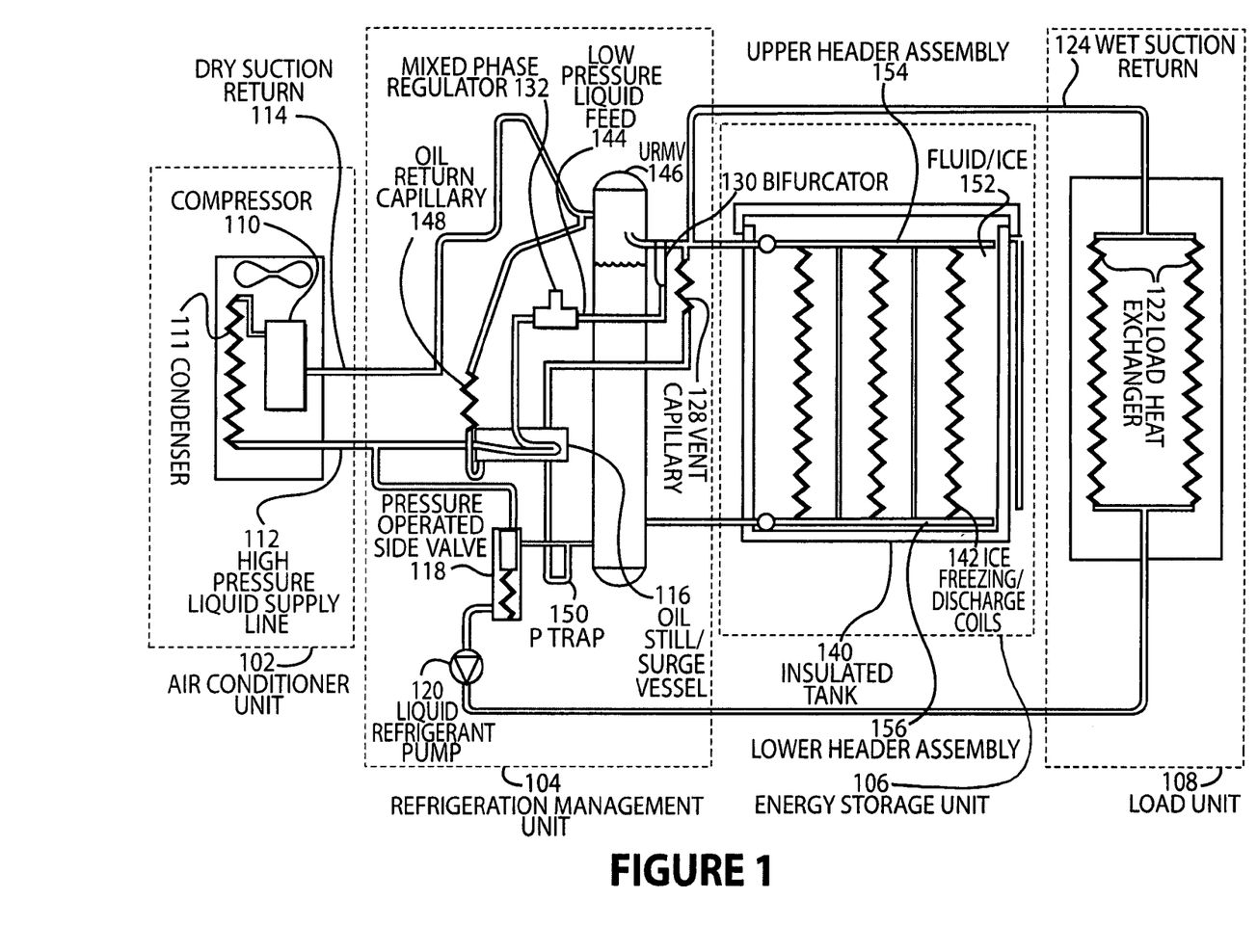
FIG. 1 illustrates an embodiment of a high efficiency refrigerant cold storage and cooling system in a mode used for cooling a process fluid.

FIG. 1 illustrates an embodiment of a high efficiency refrigerant cold storage and cooling system. The described embodiments minimize additional components and use nearly no energy beyond that used by the condensing unit to store the energy. The refrigerant cold storage design has been engineered to provide flexibility so that it is practicable for a variety of applications. The embodiments can utilize stored energy to provide chilled water for large commercial applications or provide direct refrigerant air conditioning to multiple evaporators. The design incorporates multiple operating modes, the ability to add optional components, and the integration of smart controls that allow energy to be stored and released at maximum efficiency. When connected to a condensing unit, the system stores refrigeration energy in a first time period, and utilizes the stored energy during a second time period to provide cooling. In addition, both the condensing unit and the refrigerant cold storage system can operate simultaneously to provide cooling during a third time period.

As shown in FIG. 1, an embodiment of a high efficiency refrigerant energy storage and cooling system is depicted with four major components incorporated in the system. The air conditioner unit 102 is a conventional condensing unit that utilizes a compressor 110 and a condenser 111 to produce high-pressure liquid refrigerant delivered through a high-pressure liquid supply line 112 to the refrigeration management unit 104. The refrigeration management unit 104 is connected to an energy storage unit 106 comprising an insulated tank 140 with ice-making coils 142 and is filled with a phase change liquid such as water or other eutectic material. The air conditioner unit 102, the refrigeration management unit 104 and the energy storage assembly 106 act in concert to provide efficient cooling to the load heat exchanger 108 (indoor cooling coil assembly) and thereby perform the functions of the principal modes of operation of the system.

As further illustrated in FIG. 1, the compressor 110 produces high-pressure liquid refrigerant delivered through a high-pressure liquid supply line 112 to the refrigeration management unit 104. The high-pressure liquid supply line 112 is split and feeds an oil still/surge vessel 116 and a pressure operated slide valve 118. The still/surge vessel 116 is used to concentrate the oil in the low-pressure refrigerant and return it to the compressor 110 through the dry suction return 114. Without the still/surge vessel 116, some oil would remain in the accumulator vessel, ultimately causing the compressor 110 to seize due to lack of oil, and the heat exchangers to become less effective due to fouling. The vapor rises to the top of the still/surge vessel 116 and out vent capillary 128, to be re-introduced in the wet suction return 124. This is done to encourage vapor flow out of the heat exchanger within the still/surge vessel 116, and in the preferred direction. The length of the vent capillary 128 or similar regulated bleed device is used to control the pressure in the still/surge vessel 116, and hence, the boil rate and the volume of refrigerant in the system. The pressure operated slide valve 118 also allows a secondary supply of high-pressure liquid refrigerant that can bypass of the rest of the refrigerant management system 104 and supplies liquid refrigerant to a liquid refrigerant pump 120 and directly to the load unit 108.

When activated, a liquid refrigerant pump 120 supplies the evaporator coils of the load heat exchanger 122 within the load portion 108 of the energy storage and cooling system with liquid refrigerant. Low-pressure refrigerant returns from the evaporator coils of the load heat exchanger 122 via wet suction return 124 to an accumulator or universal refrigerant management vessel (URMV) 146 and to the internal heat exchanger composed of ice freezing/discharging coils 142. The low-pressure vapor exits from the top of the URMV 146 and returns to the air conditioning unit 102 through dry suction return 114 along with the distilled oil enriched refrigerant flowing out of the bottom of the oil still/surge vessel 116 through a oil return capillary 148. The oil return capillary 148 controls the rate at which the oil is re-introduced into the system. Oil enriched liquid refrigerant passes through a P-trap 150, which eliminates (blocks) an undesired path for refrigerant should the still/surge vessel 116 become empty.

Additionally, the wet suction return 124 connects with a bifurcator 130 prior to the URMV 146. The bifurcator supplies low-pressure refrigerant from the mixed phase regulator 132 (TRVT). The mixed phase regulator 132 meters the flow of refrigerant within the system by incorporating a valve (orifice) that opens to release mixed phase refrigerant, only when there is sufficient quantity of liquid built up in the condenser 111. In this way, the compressor 110 driving the system needs merely to operate to feed high pressure refrigerant, which can be matched to the cooling load. This mixed phase regulator 132 prevents vapor bleeding into the low-pressure side (heat load portion) of the system and virtually eliminates vapor feed to the URMV 146 from the compressor 110, while also dropping the required pressure from the condenser pressure to the evaporator saturation pressure. This results in greater overall efficiency of the system while simplifying the liquid overfeed characteristics of the refrigerant management unit.

The insulated tank 140 contains dual-purpose ice freezing/discharging coils 142 (nominally geometrically designed helical coils), arranged for gravity circulation and drainage of liquid refrigerant, and are connected to an upper header assembly 154 at the top, and to a lower header assembly 156 at the bottom. The upper header assembly 154 extends outward through the insulated tank 140 to the refrigeration management unit 104. When refrigerant flows through the ice freezing/discharging coils 142 and header assemblies 154 and 156, the coils act as an evaporator and the fluid 152 solidifies in the insulated tank 140 during one time period. The ice freezing/discharging coils 142 and header assemblies 154 and 156 are connected to the low-pressure side of the refrigerant circuitry and are arranged for gravity or pumped circulation and drainage of liquid refrigerant. During a second time period, warm vapor phase refrigerant circulates through the ice freezing/discharging coils 142 and header assemblies 154 and 156 and melts the ice 152 providing a refrigerant condensing function.

The central device within the refrigerant management unit 104 is an accumulator vessel called the universal refrigerant management vessel or URMV 146. The URMV 146 is on the low-pressure side of the refrigerant circuitry and performs several functions. The URMV 146 separates liquid and vapor refrigerant during the refrigerant energy storage period and during the cooling period. The URMV 146 provides a column of liquid refrigerant during the refrigerant energy storage period that sustains gravity circulation through the ice freezing/discharging coils 142 inside the insulated tank 140. The URMV 146 is also a vapor disengaging vessel and provides for refrigerant storage. The dry suction return 114 to the air conditioner unit 102 compressor 110 during the energy storage time period is provided by an outlet at the top of the URMV vessel 140. The dry suction return 114 is placed in such a way to prevent liquid refrigerant from being returned to the compressor. A wet suction return 124 is provided through an inlet in the top of the URMV 146 for connection to an evaporator (load heat exchanger 122) during the time period when the refrigerant energy storage system provides cooling.

The first time period is the refrigerant energy storage time period or storing energy in ice. The output of the compressor 110 is high-pressure refrigerant vapor that is condensed to high-pressure liquid, (HPL). A valve (not shown) on the outlet of the refrigerant pump 120 is energized to close the connection to the load unit 108. High-pressure liquid, is surrounded by low-pressure liquid refrigerant in a second refrigerant vessel that is a combination oil still/surge vessel 116 that is connected to the low side of the refrigerant system.

During this first time period (energy storage period) the oil still/surge vessel 116 is an oil still and during the cooling period, the oil still/surge vessel 116 acts as a refrigerant surge vessel. During the energy storage period, an internal heat exchanger, in which flows high-pressure liquid refrigerant from the air conditioner unit 102, keeps all but a small amount of low-pressure liquid refrigerant out of the oil still/surge vessel 116. The refrigerant that is inside the vessel boils at a rate determined by two capillary pipes. One capillary is the vent capillary 128 that controls the level of refrigerant in the oil stilusurge vessel 116. The second, the oil return capillary 148, returns oil-enriched refrigerant to the compressor 110 within the air conditioner unit 102 at a determined rate. The column of liquid refrigerant in the URMV 146 is acted on by gravity and positioning the oil still/surge vessel 116 near the bottom of the URMV 146 column maintains a steady flow of supply liquid refrigerant to the oil still/surge vessel 116. This vessel is connected to the low-pressure liquid feed line 144 with a P-trap 150 that prevents vapor from entering the URMV 146 or the liquid refrigerant pump 120. The surge function allows excess refrigerant during the cooling period to be drained from the ice freezing/discharging coils 142 in the insulated tank 140 keeping the surface area maximized for condensing refrigerant. Physical positioning of the oil still/surge vessel 116 is a factor in its performance as a still and as a surge vessel. This oil still/surge vessel 116 additionally provides the path for return of the oil that migrates with the refrigerant that must return to the compressor 110. The slightly subcooled (cooler than the vapor-to-liquid phase temperature of the refrigerant) high-pressure liquid refrigerant that exits the oil still/surge vessel 116 flows through a mixed phase regulator 132 (thermodynamic refrigerant vapor trap) where pressure drop occurs.

As stated above, the refrigerant management unit 104 receives high-pressure liquid refrigerant from the air conditioner unit via a high-pressure liquid supply line 112. The high-pressure liquid refrigerant flows through the heat exchanger within the oil still/surge vessel 116, where it is subcooled, and connects to the mixed phase regulator 132, where the refrigerant pressure drop takes place. The use of a mixed phase regulator 132 provides many favorable functions besides liquid refrigerant pressure drop. The mass quantity of refrigerant that passes through the mixed phase regulator 132 will match the refrigerant boiling rate in the ice making coils 142 during the energy storage time period. This eliminates the need for a refrigerant level control. The mixed phase regulator 132 passes subcooled liquid refrigerant, but closes when sensing vapor (or inadequate subcooling of liquid) at its inlet. The pulsing action of the refrigerant exiting the opening and closing mixed phase regulator 132 creates a hammer effect upon the liquid refrigerant as a standing wave is produced within the closed column. This agitates the liquid refrigerant in the ice making coils 142 during the energy storage time period and enhances heat transfer as well as assists in segregating liquid and vapor phase refrigerant. The mixed phase regulator 132, in conjunction with the URMV 146, also drains the air conditioner unit 102 of liquid refrigerant keeping its surface area available for condensing. The mixed phase regulator 132 allows head pressure of an air-cooled condensing unit to float with ambient temperature. The system requires no superheat and no subcooling circuit that is mandatory with most condensing units connected to a direct expansion refrigeration device.

An adjustment to the mixed phase regulator 132 allows the refrigerant energy storage and cooling system to make ice with an average four-degree approach. The low-pressure liquid refrigerant that leaves the mixed phase regulator 132 passes through a bifurcator 130 to an eductor (or injector nozzle) located between the inlet to the URMV 146 and the upper header assembly 154 of the ice making coils 142 to assist with gravity refrigerant circulation. The bifurcator 130 reduces the pressure and the flow of the liquid refrigerant. During the refrigerant energy storage time period, the eductor creates a drop in pressure as the refrigerant leaves the bifurcator 130 thereby increasing the rate of refrigerant circulation in the ice making coils 142 and improving system performance.

The mixed phase regulator 132 also varies the flow of refrigerant in response to evaporator load. It does this by maintaining a constant pressure in the URMV 146. This allows the condensing pressure to float with the ambient air temperature. As the ambient air temperature decreases, the head pressure at the compressor 110 decreases. The mixed phase regulator 132 allows liquid refrigerant to pass but shuts down when it senses vapor. It holds the dual-phase mixture in a "trap". The liquid (being denser) is allowed to pass but starts to close when the less dense gas is passed. The vapor backs up to the condenser 111 to become further condensed into a liquid. The mixed phase regulator 132 is self regulating (once calibrated) and has no parasitic losses (adiabatic expansion). Additionally, the mixed phase regulator 132 improves the efficiency of the heat transfer in the coils of the heat exchanger by removing vapor out of the liquid and creating a pulsing action on the low-pressure side. As stated above, the mixed phase regulator 132 opens to let low-pressure liquid through and then closes to trap vapor on the high-pressure side and create a pulsing action on the low-pressure side of the regulator. This pulsing action wets more of the sub-circuit inside wall at the boiling level, which aids in the heat transfer.

The low-pressure liquid enters the URMV 146 vessel and the liquid and vapor components are separated. The liquid component fills the URMV 146 to a determined level and the vapor component is returned to the compressor of the air conditioner unit 102. In a normal direct expansion cooling system, the vapor component circulates throughout the system reducing efficiency. With this embodiment, the vapor component is returned to the compressor 110 immediately. The column of liquid refrigerant in the URMV 146 is acted upon by gravity and has two paths during the energy storage time period. One path is to the oil still/surge vessel 116 where the rate of outflow is metered by capillary tubes 128 and 148. The second path for the column of liquid refrigerant is to the lower header assembly 156, through the ice making coils 142 and the upper header assembly 154, and back to the compressor 110 through the URMV 146. This gravity circulation in this manner is how energy is stored in the form of ice when the tank is filled with a phase-change fluid such as water. A solid column of liquid refrigerant in the URMV 146 becomes less dense in the ice making coils 142, as the refrigerant becomes a vapor. This differential maintains the gravity circulation. Initially vapor, and later in the storage cycle refrigerant liquid and vapor, is returned to the URMV 146. The liquid returns to the column and the vapor returns to the compressor 110 within the air conditioning unit 102. Gravity circulation assures uniform building of the ice. As one of the ice making coils 142 builds more ice, its heat flux rate is reduced. The coil next to it now receives more refrigerant until it has an equal heat flux rate.

The design of the ice making coils 142 creates an ice build pattern that keeps the compressor suction pressure high during the ice build storage time period. During the final phase of the energy storage time period, a rapid formation of ice is built and the suction pressure drops dramatically. This is the full charge indication that automatically shuts off the condensing unit with an adjustable refrigerant pressure switch.

When the air conditioning unit 102 turns on during the energy storage time period, high-pressure liquid refrigerant forces the slide (piston) in the pressure operated slide valve to block the free flow of refrigerant to the load heat exchanger 122. When the energy storage system is fully charged and the air conditioning unit 102 shuts off, the mixed phase regulator 132 allows the refrigerant system pressures to equalize quickly. With the high-pressure liquid no longer pushing the slide closed, a spring returns the slide to the open position, allowing refrigerant to flow to the load heat exchanger 122 without restriction. In one embodiment, the load heat exchanger 122 is located below the energy storage system, and refrigerant flows by gravity to the flooded evaporator and operates as a thermosiphon.

In summary, when the tank is filled with water and refrigerant is circulated through the coils, the coils act as an evaporator, forming ice and storing energy during one time period. During a second time period, refrigerant circulates through the coils and melts the ice providing a refrigerant condensing function. This energy storage and discharge methodology is know as ice-on-coil, inside-melt. The time periods are determined by the end-user, a utility, or optional smart controls incorporated within or attached to the system.

Figure 2:
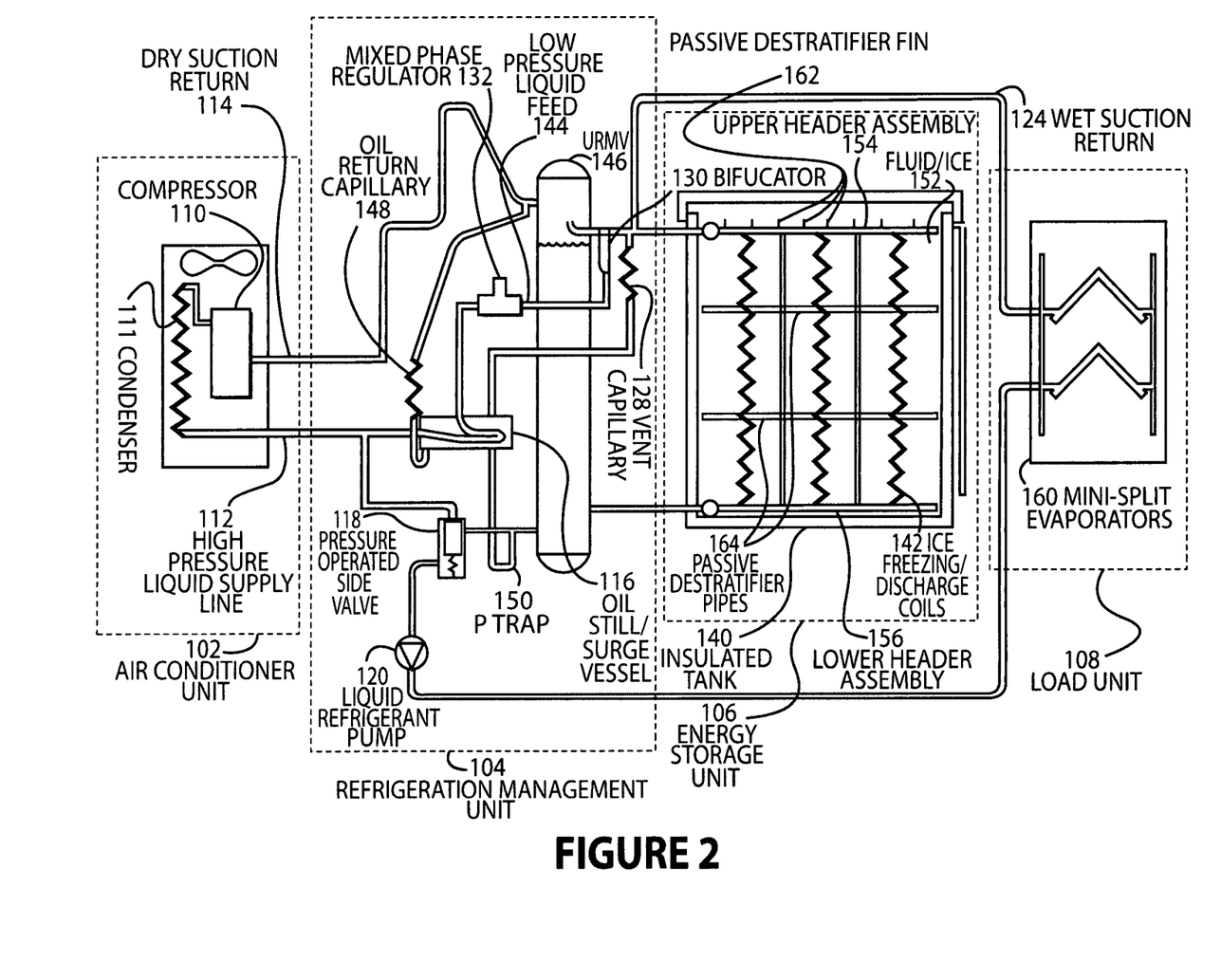
FIG. 2 illustrates an embodiment of a high efficiency refrigerant cold storage and cooling system in a configuration for air conditioning with multiple evaporators.

FIG. 2 illustrates an embodiment of a high efficiency refrigerant cold storage and cooling system in a configuration for air conditioning with multiple evaporators (which includes mini-split systems very common in Europe and the Far East). As shown in FIG. 2, various efficiency options can be added to the refrigerant cold storage and cooling system. As previously noted, a liquid refrigerant pump 120 within the refrigerant management unit 104 can be added downstream of the pressure operated slide valve 118 to circulate refrigerant to a load which is depicted as mini-split evaporators 160 in this embodiment. The coils of the heat exchangers within the mini-split evaporators 160 are fed refrigerant directly using liquid overfeed technology. In the wet suction return line 124, both liquid and vapor return to the energy storage unit 106. The vapor is condensed by discharge coils 142 within the ice 152 and the liquid refrigerant is returned to the inlet of the liquid refrigerant pump 120. Excess refrigerant that may have been utilized during the energy storage time period is now stored in the oil still/surge vessel 116. The refrigerant path options presented with the pressure operated slide valve in FIG. 2 allow both the air conditioner unit 102 and the energy storage unit 106 to provide condensing for the mini-split evaporators 160 within the load unit 108. This is called the "Push" mode and it operates during a third time period.

The pluralities of coils that comprise the ice freezing/discharge coils 142 may have a passive water destratification system consisting of passive destratifier pipes 164 in physical contact with the ice freezing/discharge coils 142 that provide a path for water displacement outside the ice boundary. These passive destratifier pipes 164, along with stays that keep the coils properly spaced, provide mechanical protection for the coils during shipment. An optional air bubbler, water pump, agitator, circulator or the like can be installed to actively destratify the fluid promoting flow in either direction. Passive destratifier fins 162 may also be used on the upper header assembly 154, the lower header assembly 156 or other heat exchange surfaces within the energy storage unit 106 to provide additional destratification and heat exchange within the fluid/ice 152.

The pluralities of coils may also have a passive water destratification system consisting of pipes in physical contact with the coils that provide a path for water displacement outside the ice boundary. These pipes, along with stays that keep the coils properly spaced, provide mechanical protection for the coils during shipment. An optional air bubbler, water pump, agitator, circulator or the like can be installed to actively destratify the fluid promoting flow in either direction.

Figure 3:
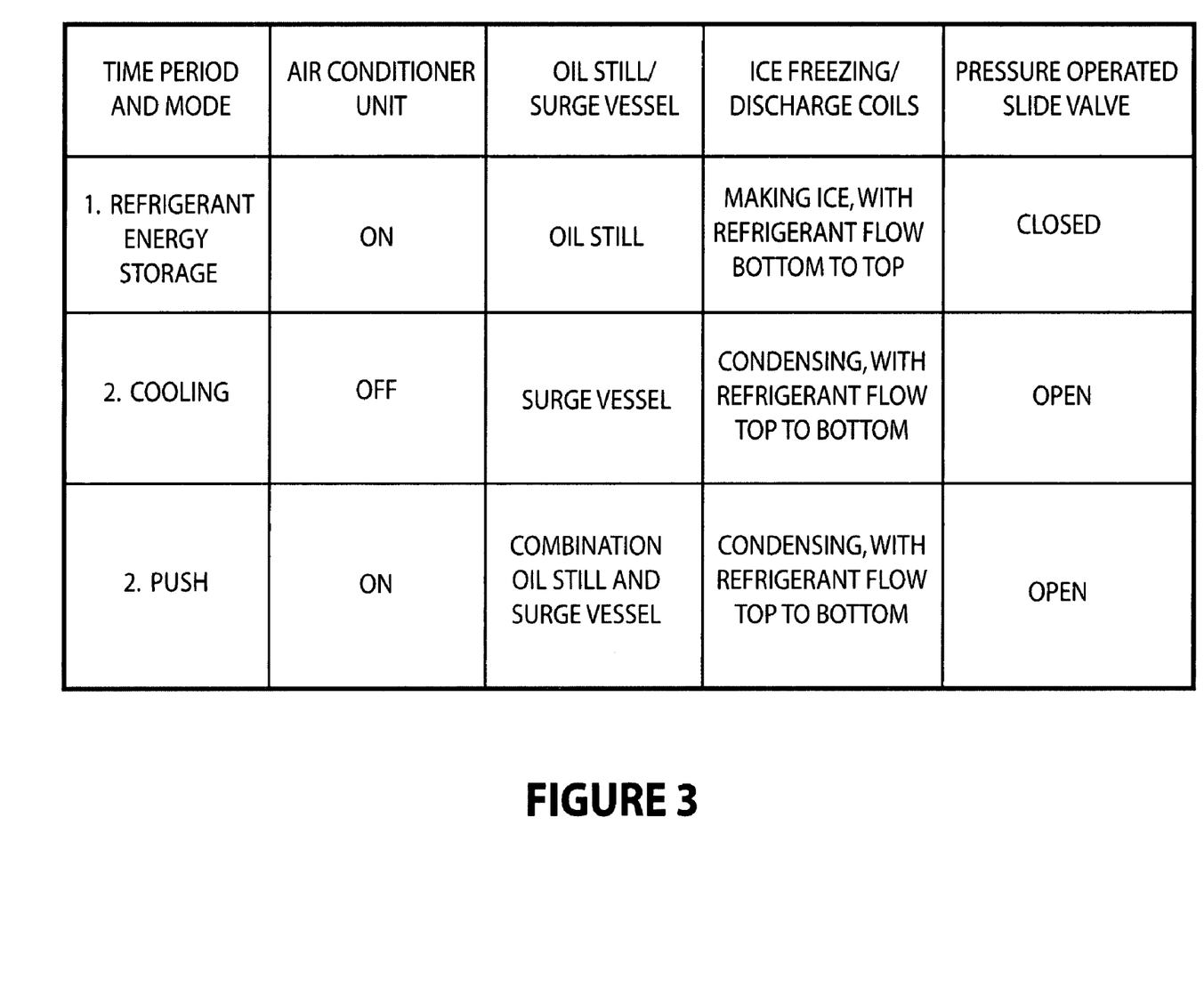
FIG. 3 is a table illustrating the component status for an embodiment of a high efficiency refrigerant cold storage and cooling system.

FIG. 3 is a table illustrating the component status for an embodiment of a high efficiency refrigerant cold storage and cooling system operating in three time periods and modes. As shown in FIG. 3, the status of the air conditioner unit 102, the oil still/surge vessel 116, the ice freezing/discharge coils 142 and the pressure operated slide valve 118 is depicted for each of the three time periods and modes described. For example, in time period 1, during the refrigerant cold storage mode, the air conditioner unit 102 is on, the oil still/surge vessel 116 is operating as an oil still, the ice freezing/discharge coils 142 are making ice with refrigerant flowing from bottom to top, and the pressure operated slide valve 118 is closed.

During this ice-make (charge) cycle, the air conditioner unit 102 supplies hot liquid refrigerant to the system. The circuit follows the path starting with high-pressure liquid from the condenser 111, through the mixed phase regulator 132 (float) that changes the refrigerant to a low-pressure liquid where it is fed into the URMV 146. The system feeds low temperature liquid to the lower header assembly 156 of the heat exchanger within the energy storage unit 106 where it gradually freezes most of the water in the insulated tank 140. Vapor phase refrigerant exits the upper header assembly and flows back into the URMV 146. Any carryover liquid falls to the bottom of the URMV 146 and repeats the circuit through the ice freezing/discharge coils 142. The resulting "dry" low-pressure vapor exits the URMV 146 and the cycle starts again.

In time period 2, during the cooling mode also referred to as the cooling or ice melt (discharge) cycle, the air conditioner unit 102 is off, the oil still/surge vessel 116 is operating as a surge vessel, the ice freezing/discharge coils 142 are condensing with refrigerant flowing from top to bottom, and the refrigerant pump 120 and the pressure operated slide valve 118 are open.

During peak energy periods, the air conditioner unit 102 connected to the system is turned off and the system discharges the ice created during the ice-make cycle. The system discharges the energy sink provided by the ice to enable cooling. In the disclosed embodiments there are two methods of cooling cycle supported by the system module: load-shifting and load-leveling. Load-shifting makes use of a single refrigeration circuit—the system connected to a standard evaporator coil to provide both sensible and latent cooling. The load-leveling mode uses two separate refrigeration circuits to provide cooling: a sensible-evaporator circuit to provide sensible cooling (removing the heat from ventilation air); and, a separate ice-evaporator to provide latent cooling (removing the humidity). A standard air conditioner unit 102 and oversized evaporator coil (load unit 108) comprise the sensible-evaporator circuit while the second evaporator coil and the energy storage unit 106 comprise the ice-evaporator circuit. The reverse can also be accomplished in other embodiments of the load leveling system.

The refrigeration circuit in load-shifting mode and the ice-evaporator circuit in the load-leveling mode are fundamentally similar with both systems being connected to an evaporator coil (load unit 108). The difference between the two is that in load-shifting mode, the load unit 108 provides both sensible and latent cooling whereas in load-leveling, the load unit 108 provides mainly latent cooling. This allows the same basic coil design the ability to perform different functions in multiple configurations.

During the ice melt cycle, the refrigerant pump 120 is the driving force for the refrigerant to the load unit 108. A unique aspect of these systems compared to standard air-conditioning systems is that the indoor unit (air handler and load unit 108) can be as far as 150 ft from the energy storage unit 106 (normal is 80 ft max). This is possible because the oil still/surge vessel 116 acts as a liquid receiver and adjusts for the additional refrigerant liquid required to traverse long lines. Standard air-conditioning systems would starve of liquid at such distances and provide poor performance. This enables the disclosed systems to be applied to much larger building than standard split system air-conditioners.

Finally, in time period 3, during the Push mode, the air conditioner unit 102 is on, the oil still/surge vessel 116 is acting as a combination oil still and surge vessel, the ice freezing/discharge coils 142 are condensing with refrigerant flowing from top to bottom, and the refrigerant pump 120 and pressure operated slide valve 118 are open. The Push mode allows the compressor 110 associated with the system (to make ice) to provide cooling directly to load unit 108. This might serve any number of purposes such as: providing cooling after ice is gone; providing additional capacity at peak times (along with the ice); and, saving ice for later, presumably for improved cost savings.

The invention claimed is:

1. A high efficiency energy storage and cooling system comprising:
    an air conditioning unit comprising a compressor and a condenser;
    an energy storage unit comprising an insulated tank that contains a storage heat exchanger and at least partially filled with a phase change liquid, said storage heat exchanger further comprising a lower collection header and an upper collection header connected by at least one thermally conductive member;
    a load heat exchanger;
    a refrigeration management unit connected to said air conditioning unit, said energy storage unit and said load heat exchanger;
    a universal refrigerant management vessel within said refrigeration management unit comprising:
        an outlet connection that returns refrigerant to said air conditioning unit;
        an inlet connection that receives refrigerant from said load heat exchanger, a mixed phase regulator, a combination oil still and refrigerant surge vessel, and said upper collection header of said storage heat exchanger;
        a first bottom port that provides bi-directional flow of refrigerant to a bottom collection header of said storage heat exchanger, said bottom outlet that supplies liquid refrigerant for connection to said load heat exchanger and said combination oil still and refrigerant surge vessel;
        a second bottom port that is connected to said combination oil still and refrigerant surge vessel; and,
    a pressure operated slide valve connected to said second bottom port and said air conditioning unit to supply refrigerant to said load heat exchanger.

2. A high efficiency energy storage and cooling system of claim 1, wherein said second bottom port is connected to said combination oil still and refrigerant surge vessel through a p-trap.

3. A high efficiency energy storage and cooling system of claim 1, wherein said phase change liquid is a eutectic material.

4. A high efficiency energy storage and cooling system of claim 1, wherein said phase change liquid is water.

5. A high efficiency energy storage and cooling system of claim 1 further comprising:
    a liquid refrigerant pump located within said refrigeration management unit.

6. A high efficiency energy storage and cooling system of claim 1 further comprising:
    a first regulated bleed device connected to, and located between said outlet connection of said universal refrigerant management vessel and said combination oil still and refrigerant surge vessel.

7. A high efficiency energy storage and cooling system of claim 6, wherein said first regulated bleed device is an oil return capillary.

8. A high efficiency energy storage and cooling system of claim 1 further comprising:

a second regulated bleed device connected to, and located between said inlet connection of said universal refrigerant management vessel and said combination oil still and refrigerant surge vessel.

9. A high efficiency energy storage and cooling system of claim 8, wherein said first regulated bleed device is a vent capillary.

10. A high efficiency energy storage and cooling system of claim 1, wherein said storage heat exchanger further comprises passive destratifier pipes.

11. A high efficiency energy storage and cooling system of claim 1, wherein said storage heat exchanger further comprises passive destratifier fins.

12. A high efficiency energy storage and cooling system of claim 1, wherein said load heat exchanger is at least one mini-split evaporator.

13. A method of providing cooling with an energy storage and cooling system comprising the steps of:
condensing refrigerant with a condensing unit to create a first condensed refrigerant during a first time period;
supplying said first condensed refrigerant to a combination oil still and refrigerant surge vessel, through a mixed phase regulator and to an inlet connection of a universal refrigerant management vessel;
supplying at least a portion of said first condensed refrigerant from said universal refrigerant management vessel to an evaporating unit constrained within a tank that is at least partially filled with a phase change liquid;
expanding said first condensed refrigerant within said evaporating unit to freeze a quantity of said phase change liquid and form ice within said tank during said first time period and produce a first expanded refrigerant;
supplying said first expanded refrigerant from said evaporating unit to said inlet connection of said universal refrigerant management vessel;
returning at least a portion of said first expanded refrigerant to said condensing unit;
circulating a second expanded refrigerant from said universal refrigerant management vessel and through said evaporating unit within said block of ice during a second time period to condense said second expanded refrigerant and create a second condensed refrigerant;
supplying said second condensed refrigerant to said universal refrigerant management vessel;
circulating at least a portion of said second condensed refrigerant from said universal refrigerant management vessel to a load heat exchanger;
expanding said second condensed refrigerant within said load heat exchanger to provide said cooling during said second time period, thereby producing additional said second expanded refrigerant; and,
returning said second expanded refrigerant to said universal refrigerant management vessel.

14. A method of claim 13, wherein said step of circulating at least a portion of said second condensed refrigerant from said universal refrigerant management vessel to a load heat exchanger is performed with a liquid refrigerant pump.

15. A method of claim 13 further comprising the step of:
regulating the flow of said second expanded refrigerant from said universal refrigerant management vessel to a load heat exchanger with a valve.

16. A method of claim 13 further comprising the step of:
recirculating distilled oil enriched refrigerant from a bottom portion of said combination oil still and refrigerant surge vessel to said condensing unit in combination with said first expanded refrigerant from said universal refrigerant management vessel.

17. A method of claim 16 further comprising the step of:
controlling the rate of the flow of said recirculating distilled oil enriched refrigerant with a first regulated bleed device.

18. A method of claim 13 further comprising the step of:
recirculating vapor from a top portion of said combination oil still and refrigerant surge vessel to an inlet connection on said universal refrigerant management vessel through a second regulated bleed device.

19. A method of claim 18 further comprising the step of:
controlling pressure in said combination oil still and refrigerant surge vessel by regulating the flow of said vapor with said second regulated bleed device.

20. A method of providing cooling with an energy storage and cooling system comprising the steps of:
condensing refrigerant with a condensing unit to create a first condensed refrigerant during a first time period;
supplying said first condensed refrigerant to a combination oil still and refrigerant surge vessel, through a mixed phase regulator and to an inlet connection of a universal refrigerant management vessel;
supplying at least a portion of said first condensed refrigerant from said universal refrigerant management vessel to an evaporating unit constrained within a tank that is at least partially filled with a phase change liquid;
expanding said first condensed refrigerant within said evaporating unit to freeze a quantity of said phase change liquid and form ice within said tank during said first time period and produce a first expanded refrigerant;
supplying said first expanded refrigerant from said evaporating unit to said inlet connection of said universal refrigerant management vessel;
returning at least a portion of said first expanded refrigerant to said condensing unit;
circulating a second expanded refrigerant from said universal refrigerant management vessel and through said evaporating unit within said block of ice during a second time period to condense said second expanded refrigerant and create a second condensed refrigerant;
supplying said second condensed refrigerant to said universal refrigerant management vessel;
circulating at least a portion of said second condensed refrigerant from said universal refrigerant management vessel to a load heat exchanger;
expanding said second condensed refrigerant within said load heat exchanger to provide said cooling during said second time period, thereby producing additional said second expanded refrigerant;
returning said second expanded refrigerant to said universal refrigerant management vessel;
recondensing at least a portion of said second expanded refrigerant with said condensing unit to create additional second condensed refrigerant during said second time period;
supplying at least a portion of said second condensed refrigerant to said load heat exchanger;
expanding said second condensed refrigerant within said load heat exchanger to produce said cooling during said second time period and produce additional said second expanded refrigerant;
supplying said second expanded refrigerant from said load heat exchanger to said inlet connection of said universal refrigerant management vessel; and, returning at least a portion of said first expanded refrigerant to said condensing unit.

21. A method of claim 20, wherein said step of circulating at least a portion of said second expanded refrigerant from said universal refrigerant management vessel and said condenser unit to a load heat exchanger is performed with a liquid refrigerant pump.

22. A method of claim 20 further comprising the step of:
regulating the flow of said second expanded refrigerant from said universal refrigerant management vessel and said condenser unit to a load heat exchanger with a valve.

23. A method of claim 20 further comprising the step of:
recirculating distilled oil enriched refrigerant from a bottom portion of said combination oil still and refrigerant surge vessel to said condensing unit in combination with said first expanded refrigerant from said universal refrigerant management vessel.

24. A method of claim 23 further comprising the step of:
controlling the rate of the flow of said recirculating distilled oil enriched refrigerant with a first regulated bleed device.

25. A method of claim 20 further comprising the step of:
recirculating vapor from a top portion of said combination oil still and refrigerant surge vessel to an inlet connection on said universal refrigerant management vessel through a second regulated bleed device.

26. A method of claim 25 further comprising the step of:
controlling pressure in said combination oil still and refrigerant surge vessel by regulating the flow of said vapor with said second regulated bleed device.

27. A method of providing cooling with an energy storage and cooling system comprising the steps of:

condensing a refrigerant with a condensing unit to create a condensed refrigerant;

supplying a first portion of said condensed refrigerant to a combination oil still and refrigerant surge vessel, through a mixed phase regulator and to an inlet connection of a universal refrigerant management vessel and a remaining portion of said condensed refrigerant to a load heat exchanger;

supplying said first portion of said condensed refrigerant from said universal refrigerant management vessel to an evaporating unit constrained within a tank that is at least partially filled with a phase change liquid;

expanding said first portion of said condensed refrigerant within said evaporating unit to freeze a quantity of said phase change liquid and form ice within said tank and produce a first expanded refrigerant;

supplying said first expanded refrigerant from said evaporating unit to said inlet connection of said universal refrigerant management vessel;

expanding said remaining portion of said condensed refrigerant within said load heat exchanger to provide said cooling thereby producing a second expanded refrigerant;

returning said second expanded refrigerant to said inlet connection of said universal refrigerant management vessel;

recondensing a combined said first expanded refrigerant and said second expanded refrigerant with said condensing unit to create additional said condensed refrigerant.

* * * * *